United States Patent [19]

Curnutt

[11] 4,245,854
[45] Jan. 20, 1981

[54] HIGH PRESSURE AIR SUSPENSION SYSTEM

[76] Inventor: Charles R. Curnutt, 75972 Baseline, 29 Palms, Calif. 92277

[21] Appl. No.: 896,808

[22] Filed: Apr. 17, 1978

[51] Int. Cl.³ .............................................. B60G 11/26
[52] U.S. Cl. ................................. 280/711; 267/65 D
[58] Field of Search ................. 280/703, 711, 714; 267/65 R, 65 D; 137/625.25, 625.33, 625.34, 625.35, 625.36, 625.48

[56] References Cited

U.S. PATENT DOCUMENTS

| 2,957,705 | 10/1960 | Herbenar | 280/714 |
|---|---|---|---|
| 2,977,110 | 3/1961 | Kilgore | 280/714 |
| 3,048,193 | 8/1962 | Cislo | 267/65 D |
| 3,477,733 | 11/1969 | Gottschalk | 280/711 |
| 4,030,715 | 6/1977 | Duran | 280/714 |

Primary Examiner—John J. Love
Assistant Examiner—John A. Carroll
Attorney, Agent, or Firm—Ralph B. Pastoriza

[57] ABSTRACT

The air suspension system includes an air cylinder and piston coupled respectively to the frame of a vehicle and a wheel axle of the vehicle. A high pressure air source is provided together with a control valve. The control valve is responsive to movements of the wheel relative to the frame as occurs when the vehicle is travelling over bumps and the like for supplying high pressure air to the cylinder from the high pressure air source to exert air pressure on the piston in a direction opposing the direction of motion of the piston as a result of the wheel movements.

10 Claims, 4 Drawing Figures

U.S. Patent
Jan. 20, 1981
4,245,854
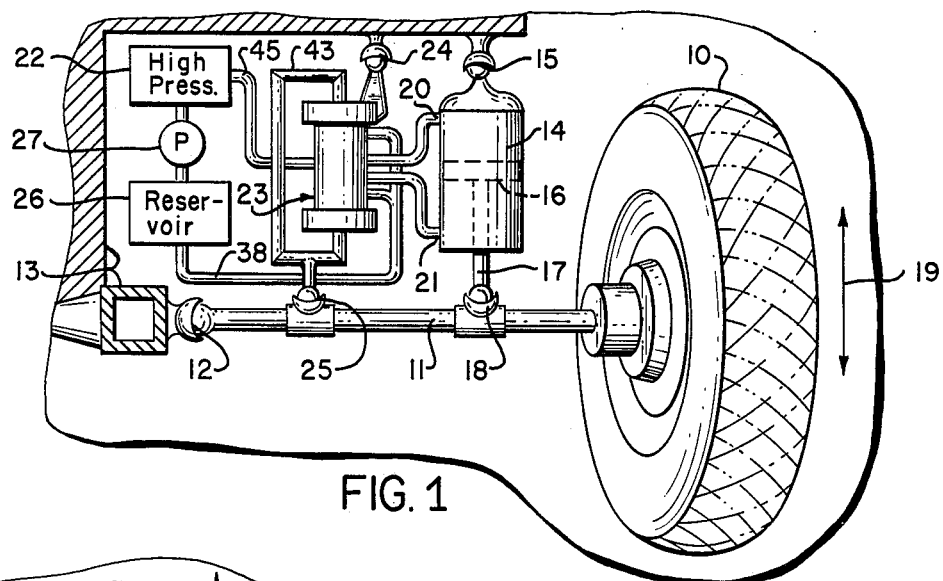
FIG. 1
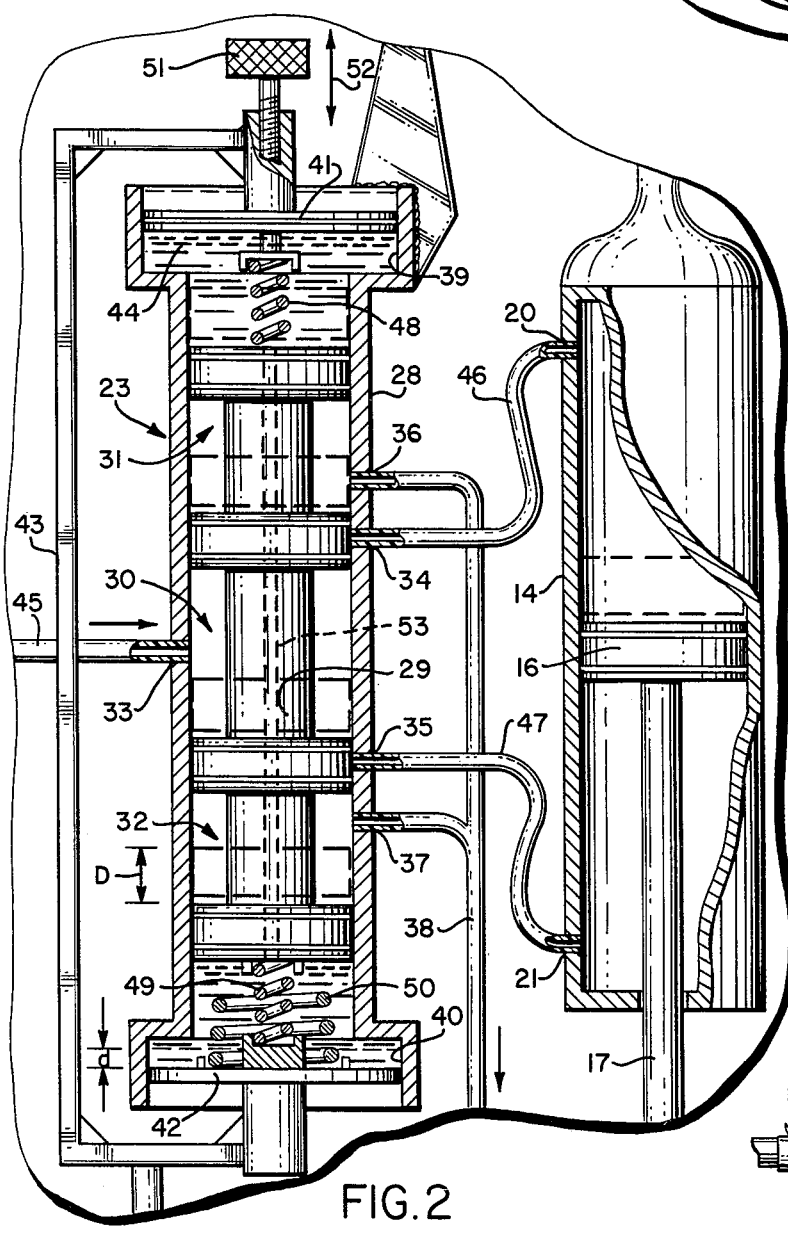
FIG. 2
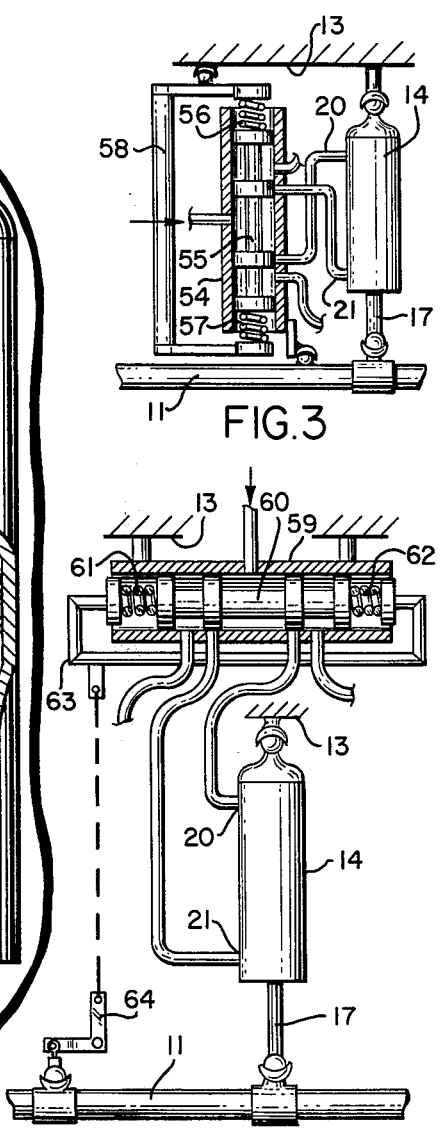
FIG. 3
FIG. 4

HIGH PRESSURE AIR SUSPENSION SYSTEM

This invention relates generally to suspension systems for vehicles such as motorcycles or automobiles and more particularly, to an active high pressure air suspension system as opposed to passive air cushioning systems.

BACKGROUND OF THE INVENTION

Most vehicle wheel suspension systems take the form of coiled springs or leaf springs between the wheel axle and vehicle frame for cushioning up and down movements of the wheel in travelling over rough terrain. Normally, shock absorbers are also provided in conjunction with the spring suspension systems for the purpose of absorbing large and sudden shocks to the suspension system.

It is also known in the prior art to provide air cushioning systems for cushioning shocks and up and down movements of a vehicle wheel axis relative to the vehicle frame. Such air suspension type systems as are known are generally of the passive type; that is, they simply rely on the elastic properties of air when compressed. In this respect, the presently known air systems function similarly to springs, and as in the case of springs, shock absorbers would normally be utilized along with the suspension.

A desirable feature of any vehicle wheel suspension system would be an arrangement whereby proper cushioning of the vehicle ride could be accomplished as well as an absorption of sudden and rapid shocks all in one type of suspension thereby avoiding the necessity of auxiliary shock absorbers. Further, it would be desirable to utilize air as the basic cushioning means as opposed to springs since the springs eventually tend to lose their elasticity; that is, the material will actually yield after prolonged use. Moreover, air generally provides a much softer cushion than spring arrangements.

While conventionally known spring suspension systems do function over their lifetime to provide a cushioned ride, there are still problems when a vehicle executes rapid accelerating and decelerating movements or rapid turns. In the case of rapid acceleration particularly when the vehicle is a motorcycle, a very large load is placed on the rear wheel which must be absorbed by the suspension system. Similarly, when decelerating rapidly the load shifts to the front wheel and the front suspension system must absorb this load. The same occurs to a lesser extent in a four-wheel vehicle.

In the case of four-wheel vehicles executing sharp turns, the centrifugal forces generated place a large load on the outside wheels and substantially decrease the load on the inside wheels. Again, any suspension system must be capable of handling these loads.

BRIEF DESCRIPTION OF THE PRESENT INVENTION

Bearing all of the foregoing considerations in mind, the present invention contemplates an air suspension type system utilizing a control source of high air pressure so designed as to provide not only an appropriately cushioned ride for a vehicle, but also serve the function of normally provided shock absorbers all to the end that the suspension system of this invention need not be supplemented by the addition of shock absorbers. The use of a controlled high pressure air source in the system distinguishes this invention from known air suspension systems which are more or less passive in nature.

More particularly, and in accord with the present invention, there is provided a high pressure air suspension system for vehicle wheels including an air cylinder and piston coupled respectively to the vehicle frame and wheel axle. A high pressure air source is provided together with a control valve means responsive to movements of the wheel relative to the frame for supplying high pressure air to the cylinder from the high pressure air source to exert air pressure on the piston in a direction opposing the direction of motion of the piston as a result of the wheel movements. Thus, there is provided a positive force opposing the up and down movement of the piston in the air cylinder which occurs because of the connection of the piston to the wheel axle to thereby provide a cushioned ride and further absorb large shocks in the manner of a conventional shock absorber.

In the preferred embodiment of this invention, the control valve is operated by a hydraulic system in turn responsive to relative movements between the wheel axle and vehicle frame. In other embodiments, the valve is so designed to be responsive to inertial forces resulting from acceleration, deceleration or tight turning of the vehicle to provide high pressure air to the air cylinder.

BRIEF DESCRIPTION OF THE DRAWINGS

A better understanding of this invention as well as many further features and advantages thereof over conventional suspension systems will be had by now referring to the accompanying drawings in which:

FIG. 1 is a part perspective, part schematic view of the preferred embodiment of the high pressure air suspension system of this invention mounted between a vehicle wheel axle and frame;

FIG. 2 is an enlarged cut-away view of the two basic components making up the preferred embodiment of the suspension system shown in FIG. 1;

FIG. 3 is a reduced view of a second embodiment of the invention; and

FIG. 4 is a similarly reduced view of a third embodiment of the invention.

DETAILED DESCRIPTION OF THE INVENTION

Referring first to FIG. 1 there is illustrated partly schematically the preferred embodiment of this present invention as applied to the wheel 10 of a motor vehicle wherein each wheel axle as shown at 11 is articulated at 12 to the vehicle frame 13.

The air suspension system itself includes an air cylinder 14 coupled to the frame at one end 15 and incorporating a piston head shown in phantom lines at 16. A piston rod 17 connecting to the head 16 in turn extends from the opposite end of the cylinder and is coupled to the axle 11 as by coupling 18. The two couplings 15 and 18 may simply constitute any suitable universal type joints.

It will be appreciated with the foregoing arrangement that up and down movement of the wheel 10 and thus the axle 11 as the vehicle is travelling and as indicated by the double headed arrow 19, will result in similar up and down movement of the piston head 16 within the air cylinder 14.

As shown in FIG. 1 and as will become clearer with respect to the remaining FIGURES, the air cylinder 14 includes first and second air ports at opposite ends as indicated at 20 and 21. These ports are arranged to receive high pressure air from a high pressure air source designated by the block 22 shown in the upper left of FIG. 1 by way of a control valve means designated generally by the numeral 23 in the center of FIG. 1.

Essentially, the control valve means 23 includes a valve cylinder coupled to the vehicle frame 13 through a universal joint 24 at one end, and an actuating hydraulic system for the valve coupled to the axle 11 at 25. An appropriate high pressure air inlet port in the control valve cylinder connects to the high pressure source 22 and appropriate high pressure outlet ports connect respectively to the first and second air inlet ports 20 and 21 of the air cylinder 14. Suitable exhaust ports are also provided for exhausting the air through a common hose to an air reservoir 26 shown to the left of FIG. 1. Air from this reservoir can be pumped by a pump 27 into the high pressure source 22 thereby providing a closed system.

The foregoing will become clearer as well as additional features of this invention by now referring to the enlarged cut-away view of FIG. 2. Referring first to the upper central portion of FIG. 2, the valve control means 23 comprises a valve cylinder 28 within which a slide spool 29 is arranged to move back and forth. Spool 29 sealingly defines with the inside cylindrical wall of the valve cylinder 28 a central and two outer axially spaced circumferential channels 30 and 31, 32 respectively. The high pressure inlet port briefly referred to in FIG. 1 is shown at 33 communicating with the central channel 30 and the high pressure source 22 described in FIG. 1. Also, the high pressure outlet ports briefly referred to in FIG. 1 are shown at 34 and 35 eclipsed or closed by portions of the slide spool 29 when this slide spool is in a central position as shown. As described heretofore, the high pressure outlet ports 34 and 35 communicate with the first and second inlet ports 20 and 21 of the air cylinder 14 as shown. The referred to exhaust ports in the valve cylinder 28 are shown at 36 and 37 communicating with the outer channels 31 and 32 when the spool 29 is in the central position, these exhaust ports connecting to a common exhaust hose 38 which extends to the air reservoir 26 described in FIG. 1 to provide the closed system.

Still referring to FIG. 2, the control valve means in the preferred embodiment set forth further includes first and second increased diameter cylindrical end portions 39 and 40 shown at the top and bottom of the valve cylinder 28. These end cylindrical portions communicate with opposite ends of the spool 29 and include first and second hydraulic sealed pistons 41 and 42 respectively. Pistons 41 and 42 are mechanically coupled together as by bar structure 43 to move simultaneously in an up and down direction as viewed in FIG. 2. As indicated in FIG. 2, hydraulic fluid such as oil 44 fills the end cylindrical portions 39 and 40 between the pistons 41 and 42 and opposite ends of the spool 29.

The hydraulic arrangement described results in an amplified movement of the spool 29 within the valve cylinder 28 in response to movement of the pistons 41 and 42 in the end cylindrical portions 39 and 40. This amplified movement is a result of the difference in the cross sectional areas of the cylindrical end portions and valve cylinder 28.

In FIG. 2, there is shown at the central left portion an input hose line 45 to the high pressure inlet port 33, this line extending from the high pressure source 22 described in FIG. 1. Also shown are hose lines 46 and 47 connecting the high pressure outlet ports 34 and 35 to the first and second inlet air ports 20 and 21 of the air cylinder 14.

In order to hold the slide spool 29 in its referred to central position in the valve cylinder 28, there are provided first and second springs shown at 48 and 49 positioned respectively between the first and second hydraulic pistons 41 and 42 and the opposite ends of the slide spool 29. In addition, there may be provided a bumper spring shown at 50 secured to the lower second hydraulic piston 42 in a position to engage the lower end of the spool 29 should it move downwardly beyond a given amplitude.

Referring to the top of FIG. 2, there is provided a simple adjustment means in the form of a threaded knob structure 51 for changing the force applied by the first spring 48 on the spool 29 to enable adjustment of the centering of this spool. Thus, rotation of the adjustment knob 51 will essentially move the upper support for the spring 48 in an up or down direction as indicated by the double-headed arrow 52.

The structure of FIG. 2 is completed by the provision of a small bore extending axially through the spool 29 and shown in phantom lines at 53. This bore will permit bypassing of some of the oil 44 in the end cylindrical portions to, in effect, cushion the applied hydraulic force when the hydraulic pistons 41 and 42 move rapidly in an up and down direction.

OPERATION OF THE EMBODIMENTS OF FIGS. 1 AND 2

Referring once again to FIG. 1, when the wheel 10 is subject to rapid shocks as would take place when the vehicle is travelling over a rough road, the wheel 10 and axle 11 will move rapidly up and down as indicated by the double headed arrow 19. This up and down motion in turn will be transmitted to the piston head 16 in the air cylinder 14 through the piston rod 17 causing rapid up and down movement of this piston head. In addition, the same motion although of slightly less amplitude because of the articulation of the axle 11 at 12, will be transmitted to the mechanical interconnection 43 between the hydraulic pistons of the valve control means 23 in view of the coupling 25 to the axle 11.

Referring specifically to FIG. 2, assume that the wheel 10 strikes a raised bump in the roadway causing a rapid upward movement of the wheel and axle relative to the vehicle frame 13. This sudden upward motion will cause the piston head 16 in the air cylinder 14 as shown in FIG. 2 to move upwardly as depicted by the phantom lines. Similarly, the spool 29 in the valve cylinder 28 will be moved upwardly as a consequence of upward movement of the hydraulic piston 42 which exerts a force on the oil to the lower end of the spool 29. The upward movement of the spool to a new position is indicated also by phantom lines in FIG. 2.

In the new position of the spool 29, it will be noted that the high pressure outlet port 34 is placed into communication with the central channel 30 thereby receiving high pressure air through the high pressure air inlet port 33. This high pressure air is transferred through the hose 46 directly to the air inlet 20 of the air cylinder 14 thereby opposing the upward movement of the piston head 16.

Simultaneously with upward movement of the spool 29, the high pressure outlet port 35 in the valve cylinder 28 is placed into communication with the outer channel 32 and thus with the exhaust port 37 thereby exhausting air from the underside of the piston 16 in the air cylinder 14 through the hose 47 and outlet exhaust hose 38.

After the vehicle has passed over the bump, the wheel and axle will drop or move in an opposite direction relative to the frame 13 so that the piston 16 will then be moved downwardly in the air cylinder 14. Simultaneously, the valve spool 29 will be forced downwardly by the downward movement of the hydraulic piston 41. Such downward movement will then serve to place the high pressure outlet port 35 in communication with the central channel 30 so that high pressure air is immediately applied through the outlet port 35, hose 47 and air port 21 to the underside of the piston head 16 in the air cylinder 14 thus again opposing the direction of motion of this piston.

When the vehicle is travelling over a fairly smooth road, both the piston head 16 and the valve spool 29 will tend to stay in the central solid line positions shown wherein the high pressure air in the central channel 30 is blocked from passing to either one of the air ports 20 and 21 in the air cylinder 14. The piston 16 is in sealing engagement with the cylinder side walls as shown so that no air passes around the piston in the cylinder. The natural elasticity of the air will thus serve to cushion the normal smooth ride and in this respect, will function in the manner of conventional coil springs. However, it will be appreciated, as described, that sudden shocks will result in sufficient movement of the piston head 16 and spool 29 to immediately apply the high pressure air to one side or the other of the piston head 16 thereby providing an opposing shock absorbing action.

From the foregoing, it can be immediately appreciated that the high pressure air suspension system as described in FIGS. 1 and 2 functions both as a smooth air suspension system and also a shock absorbing system.

DESCRIPTION OF THE EMBODIMENTS OF FIGS. 3 AND 4

The present invention lends itself well to operation by inertial forces. For example, and with reference to FIG. 3, the hydraulic actuating system for the valve control means 23 described in FIG. 2 in certain applications could be omitted and the valve cylinder 28 itself tied directly to the axle 11. Such an example is illustrated in FIG. 3 wherein the valve cylinder is indicated at 54 secured to the axle 11 and oriented in a vertical direction. The valve spool 55 is vertically slidable in the valve cylinder 54 and includes springs 56, 57 and yoke 58 tied to the frame normally holding the valve spool 55 in a central position. Interconnections between the valve cylinder and air cylinder 14 are reversed from those shown in FIG. 2 for reasons that will become apparent.

In FIG. 3, the mass of the valve spool 55 is made sufficient as to result in relative movement between the spool and valve cylinder as a result of inertial forces created by up and down movement of the wheel axle 11. For example, considering the first illustration with respect to FIG. 2 assume that the wheel and wheel axle 11 is subject to a sudden upward movement. This motion will again raise the piston in the air cylinder 14 and will also raise the valve cylinder 54 in view of its direct securement to the axle 11. The mass of the spool 55 however, will tend to hold it at rest in opposition to the spring force provided by spring 57. The spool 55 thus moves downwardly with respect to the valve cylinder 54 so that, with reference to the structure of FIG. 2, the lower high pressure port 35 will be placed in communication with the central channel 30 to receive high air pressure. However, in FIG. 3 this port connects to the first air inlet 20 of the air cylinder 14 so that the high pressure air is applied to the upper side of the piston in the cylinder 14 to oppose the upward motion thereof all as described in FIG. 2.

A similar action takes place in response to a sudden drop of the wheel and axle 11 in which event, the spool 55 moves upwardly relative to the valve cylinder to apply the high pressure air to the lower inlet air port 21 of the air cylinder 14. Follow up action of the yoke 58 recenters the spool.

With the arrangement of FIG. 3, the action of the spool 55 depending upon the overall weight of the vehicle can be adjusted by changing the centralizing forces on the end springs 56 and 57 and/or adjusting the mass of the spool.

Referring now to FIG. 4, there is illustrated an embodiment similar to FIG. 3 but wherein the control valve means is oriented horizontally and secured to the vehicle frame 13. Thus, referring specifically to FIG. 4, the air valve cylinder is shown at 59 secured to the frame 13 in a horizontal position so that the spool 60 will move back and forth along a horizontal axis. End springs 61 and 62 with yoke 63 coupled through bell crank 64 to the axle hold the spool in a normally central position. The high pressure outlet valves for the valve cylinder 59 connect through appropriate hoses to the air ports 20 and 21 for the air cylinder 14 in a manner similar to that described in FIG. 2.

The embodiment of FIG. 4 might be useful on a motorcycle wherein the horizontal axis of the valve spool 60 is aligned in a fore and aft direction. Under these conditions, when the motorcycle accelerates rapidly thereby placing a weight on the rear wheel, the piston in the air cylinder 14 will move upwardly in view of its connection to the axle 11. Simultaneously, assuming that a foreward direction is to the left as viewed in FIG. 4, the spool 60 will tend to stay stationary because of its inertia while the valve cylinder 59 moves to the left. High pressure air from the central channel will thus be passed to the air inlet 20 to again oppose the upward motion of the piston in the air cylinder 14.

Similarly, should the motorcycle decelerate rapidly the spool 60 will tend to move forwardly relative to the valve cylinder 59 thereby applying high pressure air from the central channel to the lower air inlet 21 of the air cylinder 14 opposing the resulting downward movement of the piston and axle 11 as a consequence of such rapid deceleration.

The embodiment of FIG. 4 can also be used to aid in holding a vehicle level in sharp turns. For example, by orienting the horizontal axis of the spool 60 in a transverse direction to the direction of motion of a vehicle, when the vehicle rounds a sharp curve, centrifugal force will tend to throw the spool 60 in a radial outward direction with respect to the curve travelled by the vehicle. For example assume that the structure of FIG. 4 is mounted on the vehicle and the vehicle is travelling forwardly in a direction out of the plane of the drawing, that is, towards the viewer so that the axis of the spool 60 is transverse or at right angles to the direction of motion. If it is assumed that the vehicle swerves for example to the left of the viewer while coming towards him, the spool 60 will be thrown to the right as viewed in FIG. 4 thereby applying high pressure from the central channel to the inlet port 20 of the air cylinder 14. This high pressure air will oppose the upward motion of the piston head in the air cylinder 14 resulting from the upward movement of the outside wheels and axle created by the sudden swerving of the car and thus tend to level the car during the turn.

Similar centrifugal forces operate the spool in the reverse manner when the car swerves in the opposite direction.

As in the case of the embodiment of FIG. 3, the end springs 61, 62 and the yoke 63 by way of the bell crank 64 sense the relative positions of the axle and frame to return the spool 60 to a central position. The force applied by the springs can be adjusted as well as the mass of the spool to provide the desired amount of levelling action depending on the mass of the vehicle and so forth.

It should be understood in the particular embodiment described in FIGS. 3 and 4 that the mass of the spool and its inertia properties is the dominant control whereas the end springs and yoke structures merely sense the moved positions to return the spool to its central normal position. Contrarywise, in the embodiment of FIG. 2, the dominant control is the hydraulic action of the end pistons operating on the spool to positively move the spool through the end springs in response to movement of the axle. However, it should be understood that the spool in FIG. 2 also exerts a secondary effect because of its inertia. In this respect, should a vehicle "jump" the inertia of the spool will come into effect when the vehicle is initially flying through the air. In this respect the inertia of the spool will tend to hold it in its upwardly moved position during the free flight of the vehicle thereby providing the continuous high pressure opposing force on the piston in the air cylinder which will move the piston downwardly towards the lower end providing the maximum space between the axle and frame. Thus, when the vehicle lands, there will be a maximum cushioning effect because of the relatively larger stroke the piston can make when moving upwardly in the air cylinder as a consequence of impact of the wheel on the ground.

In the case of a four wheel vehicle, the preferred embodiment will be used on each wheel of the vehicle, that is, there is provided a separate suspension system for each wheel. Moreover, combinations of the embodiments described can be used to realize the various advantages with respect to control of acceleration, deceleration and turning of the vehicle as well as control when the vehicle "jumps".

With respect to the foregoing, it will be understood that the "stiffness" of the entire suspension system can readily be adjusted by adjusting the pressure of the air at the high pressure source. Thus, by providing a fairly high pressure, for example, of the order of 2500 psig, a "stiff" action results whereas if the high pressure source is reduced to perhaps 1500 psig, a much softer or more "cushiony" ride results.

For clarity in illustration and ease of explanation, the end springs in the various embodiments have been coupled together by way of the bar 43 in FIG. 2 or the yoke structures 58 and 63 in FIGS. 3 and 4 respectively. It should be understood, however, that such interconnection could be effected by an axial bar or rod passing centrally through the spool such as through the bleed bore 53 described in FIG. 2. This rod would pass loosely through the bore 53 so that bleeding could take place about the exterior of the rod and the interior of the bore. The ends of the rod would pass axially through the end springs and be appropriately coupled to the pistons 41 and 42 thereby effecting an equivalent mechanical connection as afforded by the bar structure 43.

Finally, while all of the embodiments have been described with respect to the use of high pressure air, it should be understood of course that any gas such as nitrogen or an inert gas could be utilized. In this latter event, the closed system utilized in the reservoir 26 described in FIG. 1 would be provided. In the case of air, it is not necessary to provide a closed system since the air is always available. However, even with air, a closed system is preferable from the standpoint of efficiency.

From all of the foregoing it will thus be evident that the present invention has provided a novel pressure air suspension system eliminating the need for provision of separate shock absorbers in addition to the suspension system.

I claim:

1. A high pressure air suspension system for each wheel of a vehicle having an axle articulated to the vehicle frame, including, in combination:
    (a) an air cylinder coupled to said frame at one end;
    (b) a piston head normally centrally positioned in said cylinder having a piston rod extending from the end of said cylinder opposite said one end, coupled to said axle so that said piston will move back and forth in said cylinder with up and down movements of said wheel relative to said frame, said cylinder having a first air port at said one end and a second air port at its opposite end;
    (c) a high pressure air source;
    (d) a control valve means connected between said high pressure air source and said first and second air ports and having a slide spool for passing high pressure air to one or the other of said ports and simultaneously exhausting air through the other or one of said ports respectively, depending upon the position of said spool; and
    (e) means on said control valve means responsive to said up and down movements of said wheel relative to said frame to move the position of said slide spool to connect said high pressure air source to the end port towards which said piston head is moved to thereby increase the air pressure in said cylinder exerted on said piston head in a manner opposing the direction of movement of said piston head.

2. A system according to claim 1, in which said control valve means includes a valve cylinder within which said slide spool can move back and forth, said spool defining a central and two outer axially spaced circumferential channels with the inside wall of said valve cylinder, said valve cylinder having a high pressure inlet port communicating with said central channel and with said high pressure air source; first and second high pressure outlet ports in said valve cylinder communicating with said first and second air ports in said air cylinder, said outlet ports being eclipsed by said spool when said spool is in a central position; and first and second air exhaust ports in said valve cylinder communicating with said two outer channels respectively when said spool is in said central position, said means on said control valve means responsive to said up and down movements including first and second increased diameter cylindrical end portions communicating with opposite ends of said spool respectively; first and second hydraulic pistons in said cylindrical end portions mechanically coupled together for simultaneous movement and coupled to said wheel axle, said valve cylinder being coupled to said frame; and hydraulic fluid in said cylindrical end portions so that said spool is moved an amplified distance by said hydraulic fluid when said hydraulic pistons move as a consequence of said up and down wheel movements relative to said frame, movement of said spool in one direction placing said first high pressure outlet port in communication with said central channel to provide high air pressure to said first air port in said air cylinder, said second high pressure outlet port being placed in communication with said exhaust port to exhaust air out said second air port in said air cylinder, and movement of said spool in an opposite direction placing said second high pressure outlet port in communication with said central channel to provide high air pressure to said second air port in said air cylinder, said first high pressure outlet port being placed in communication with said first exhaust port to exhaust air out said first air port in said air cylinder.

3. A system according to claim 2, including first and second springs positioned respectively between said first and second hydraulic pistons and the ends of said spool to return said spool to its normally central position in the absence of any up and down movement of said wheel.

4. A system according to claim 3, including means for adjusting the force exerted by said first spring on said spool so that said spool can be properly centrally positioned.

5. A system according to claim 4, including a bumper spring between said second hydraulic piston and end of said spool positioned to be engaged by said spool should it move beyond a given amplitude in said opposite direction.

6. A system according to claim 5, including an air reservoir connected between said high pressure air source and said exhaust ports to provide a closed air system.

7. A system according to claim 6, in which said spool includes a longitudinal bore passing axially therethrough to provide communication between hydraulic fluid in said cylindrical end portions.

8. A high pressure air suspension system for vehicle wheels, including, in combination:
(a) an air cylinder and piston coupled respectively to the vehicle frame and wheel axle;
(b) a high pressure air source; and,
(c) control valve means responsive to rapid movements of said wheel axle relative to said frame, said control valve means including a valve cylinder having a high pressure inlet port coupled to said high pressure air source, first and second high pressure outlet ports connected to opposite ends of said air cylinder and first and second exhaust ports; and a sliding spool in said valve cylinder having channels for directing high pressure air at said high pressure inlet port to one or the other of said high pressure outlet ports depending on the position of said spool and simultaneously connecting that outlet port not subject to said high pressure air to one of said exhaust ports to thereby exert air pressure on said piston in a direction opposing the direction of motion of said piston as the result of said movements, said control valve means further including hydraulic means responsive to movement of said wheel axle relative to said frame for moving said spool.

9. A high pressure air suspension system for vehicle wheels, including, in combination:
(a) an air cylinder and piston coupled respectively to the vehicle frame and wheel axle;
(b) a high pressure air source; and,
(c) control valve means responsive to rapid movements of said wheel axle relative to said frame, said control valve means including a valve cylinder having a high pressure inlet port coupled to said high pressure air source, first and second high pressure outlet ports connected to opposite ends of said air cylinder and first and second exhaust ports; and a sliding spool in said valve cylinder having channels for directing high pressure air at said high pressure inlet port to one or the other of said high pressure outlet ports depending on the position of said spool and simultaneously connecting that outlet port not subject to said high pressure air to one of said exhaust ports to thereby exert air pressure on said piston in a direction opposing the direction of motion of said piston as the result of said movements, said valve cylinder being secured to said wheel axle and vertically oriented, and upper and lower end springs bearing on opposite ends of said spool to normally hold it in a central position, said spool having a sufficient mass as to result in relative movement between said spool and said valve cylinder as a result of inertial forces created by up and down movement of said wheel axle, to operate said valve.

10. A high pressure air suspension system for vehicle wheels, including, in combination:
(a) an air cylinder and piston coupled respectively to the vehicle frame and wheel axle;
(b) a high pressure air source; and,
(c) control valve means responsive to rapid movements of said wheel axle relative to said frame, said control valve means including a valve cylinder having a high pressure inlet port coupled to said high pressure air source, first and second high pressure outlet ports connected to opposite ends of said air cylinder and first and second exhaust ports; and a sliding spool in said valve cylinder having channels for directing high pressure air at said high pressure inlet port to one or the other of said high pressure outlet ports depending on the position of said spool and simultaneously connecting that outlet port not subject to said high pressure air to one of said exhaust ports to thereby exert air pressure on said piston in a direction opposing the direction of motion of said piston as the result of said movements, said valve cylinder being secured to said frame in an horizontal position; and end springs bearing on opposite ends of said spool to normally hold it in a central position, said spool having a sufficient mass as to result in relative movement between said spool and valve cylinder as a result of intertial forces created by movement of said vehicle, to operate said valve.

* * * * *